US009806998B2

(12) United States Patent
Keesara et al.

(10) Patent No.: US 9,806,998 B2
(45) Date of Patent: Oct. 31, 2017

(54) METHOD OF REDUCING TRAFFIC LOSS WHEN BRINGING UP A SWITCH WITHIN A MULTI CHASSIS SWITCH CLUSTER WITHOUT USING DEDICATED INTRA CLUSTER LINKS

(71) Applicant: Avaya Inc., Basking Ridge, NJ (US)

(72) Inventors: Srikanth Keesara, Tewksbury, MA (US); Sakthivadivu Saraanaraj, Nashua, NH (US); Lava Lavu, Bedford, MA (US)

(73) Assignee: Extreme Networks, Inc., San Jose, CA (US)

( * ) Notice: Subject to any disclaimer, the term of this patent is extended or adjusted under 35 U.S.C. 154(b) by 136 days.

(21) Appl. No.: 14/298,011

(22) Filed: Jun. 6, 2014

(65) Prior Publication Data
US 2015/0358204 A1    Dec. 10, 2015

(51) Int. Cl.
*H04L 12/721* (2013.01)
*H04L 12/24* (2006.01)
*H04L 12/725* (2013.01)
*H04L 12/751* (2013.01)
*H04L 12/709* (2013.01)

(52) U.S. Cl.
CPC .......... *H04L 45/38* (2013.01); *H04L 41/0659* (2013.01); *H04L 45/02* (2013.01); *H04L 45/245* (2013.01); *H04L 45/304* (2013.01)

(58) Field of Classification Search
None
See application file for complete search history.

(56) References Cited

U.S. PATENT DOCUMENTS

| 7,248,579 B1* | 7/2007 | Friedman | H04L 45/02 370/389 |
| 8,730,963 B1* | 5/2014 | Grosser, Jr. | H04L 12/462 370/219 |
| 2009/0150563 A1* | 6/2009 | Piekarski | H04L 49/70 709/238 |
| 2010/0290778 A1* | 11/2010 | Nishioka | H04L 41/0672 398/2 |
| 2012/0182866 A1* | 7/2012 | Vinayagam | H04L 45/245 370/228 |
| 2012/0275297 A1* | 11/2012 | Subramanian | H04L 45/245 370/225 |

(Continued)

*Primary Examiner* — Faruk Hamza
*Assistant Examiner* — Cassandra Decker
(74) *Attorney, Agent, or Firm* — Haley Guiliano LLP (57) ABSTRACT

A method, apparatus and computer readable medium for reducing traffic loss when bringing up a switch within a multi chassis switch cluster without using dedicated intra cluster links is presented. A first network device in a cluster discovers at least one path to a second network device in the cluster, wherein the cluster utilizes at least one virtual IST between the first network device and the second network device. The first network device starts an Inter Switch Trunk (IST) synchronization process with the second network device. The first network device installs redirection rules, wherein the redirection rules are used for datapath traffic and are not used for control channel traffic. The first network device determines that the IST synchronization process between the first network device and the second network device has completed, and removes the redirection rules.

17 Claims, 6 Drawing Sheets

(56) References Cited

U.S. PATENT DOCUMENTS

| | | | |
|---|---|---|---|
| 2013/0212297 A1* | 8/2013 | Varga | H04L 12/4633 709/238 |
| 2014/0211792 A1* | 7/2014 | Li | H04L 49/552 370/389 |
| 2015/0131474 A1* | 5/2015 | Zhang | H04L 41/12 370/254 |

* cited by examiner

METHOD OF REDUCING TRAFFIC LOSS WHEN BRINGING UP A SWITCH WITHIN A MULTI CHASSIS SWITCH CLUSTER WITHOUT USING DEDICATED INTRA CLUSTER LINKS

BACKGROUND

Multi Chassis Switch Cluster technology is used to offer a high degree of protection to network traffic during events that cause a link or switch to go down or come back up. These events could be caused either by failure and recovery of networking components or due to maintenance operations in the network. Switch clustering relies on the following two Intra Cluster components to meet the expectations of a network operator for network resiliency. The first component is a channel for control communication between the switches within a switch cluster. This is used to exchange information relating to forwarding tables, port state information and the like that is applicable to maintaining a resilient switch cluster. The second component is Intra Cluster Traffic paths to carry data traffic between the cluster switches. These are used in the event traffic needs to be redirected to handle common network faults.

Traditionally IST was implemented using dedicated links directly connecting the cluster switches. A cluster switch as it is coming up—keeps the network traffic from outside the cluster away from itself by only allowing directly connected intra cluster links to come up until after it completes the cluster synchronization process. This allows its cluster peers to service the network traffic while the switch is getting ready. This synchronization process is done on the IST control channel. After the cluster synchronization process is complete, other links on the switch are enabled and the switch is then able to forward the traffic.

Virtual IST technology can use any links in the core of the network for the IST. This has the advantage of increasing the robustness of the network by keeping the switch cluster up as long as there is a core network path between the switches within a cluster. Since the Virtual IST technology does not use dedicated IST links—all core network facing links are enabled and core network routing protocols are started in order to bring up the IST control channel.

SUMMARY

Conventional methods, such as those explained above, suffer from a variety of deficiencies. Typically as the switch becomes operational it goes through a phase called IST synchronization with other members of the switch cluster that are already fully operational. The synchronization process allows the switch to receive the current state of the Multi Chassis Link Aggregation Group (LAG) ports and forwarding tables for Media access control (MAC), Address Resolution Protocol (ARP), Internet Protocol (IP) Multicast, etc. This synchronization process starts after connectivity between the cluster peers is established and can take a few seconds of time to complete. During this time, the switch is vulnerable to causing a traffic loss. Any traffic that it receives during this time is likely to be lost—since the switch does not have forwarding tables to correctly forward all the traffic flows that it receives.

In A Virtual IST configuration, when the switch is coming up, the act of enabling the core network links also causes other switches in the network to send regular network traffic to the switch before the switch is ready to handle such traffic. This traffic is dropped because the switch does not yet know how to forward the traffic. This can cause several seconds worth of loss of traffic loss in the network.

In a particular embodiment of a method for reducing traffic loss when bringing up a switch within a multi chassis switch cluster without using dedicated intra cluster links the method includes discovering, by a first network device in a cluster, at least one path to a second network device in the cluster, wherein the cluster utilizes at least one virtual IST between the first network device and the second network device. The method also includes starting, by the first network device, an Inter Switch Trunk (IST) synchronization process with the second network device. The method further includes installing, by the first network device, redirection rules wherein the redirection rules are used for data traffic and are not used for control channel traffic. Additionally the method includes determining, by the first network device, that the IST synchronization process between the first network device and the second network device has completed. The method also includes removing, by the first network device, the redirection rules.

Other embodiments include a computer readable medium having computer readable code thereon for reducing traffic loss when bringing up a switch within a multi chassis switch cluster without using dedicated intra cluster links. The computer readable medium includes instructions for discovering, by a first network device in a cluster, at least one path to a second network device in the cluster, wherein the cluster utilizes at least one virtual IST between the first network device and the second network device. The computer readable medium also includes instructions for starting, by the first network device, an IST synchronization process with the second network device. The computer readable medium further includes instructions for installing, by the first network device, redirection rules wherein the redirection rules are used for Data traffic and are not used for control channel traffic. Additionally the computer readable medium includes instructions for determining, by the first network device, that the IST synchronization process between the first network device and the second network device has completed; and instructions for removing, by the first network device, the redirection rules.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that is useful for reducing traffic loss when bringing up a switch within a multi chassis switch cluster without using dedicated intra cluster links.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an attribute level change history as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Figure 1:
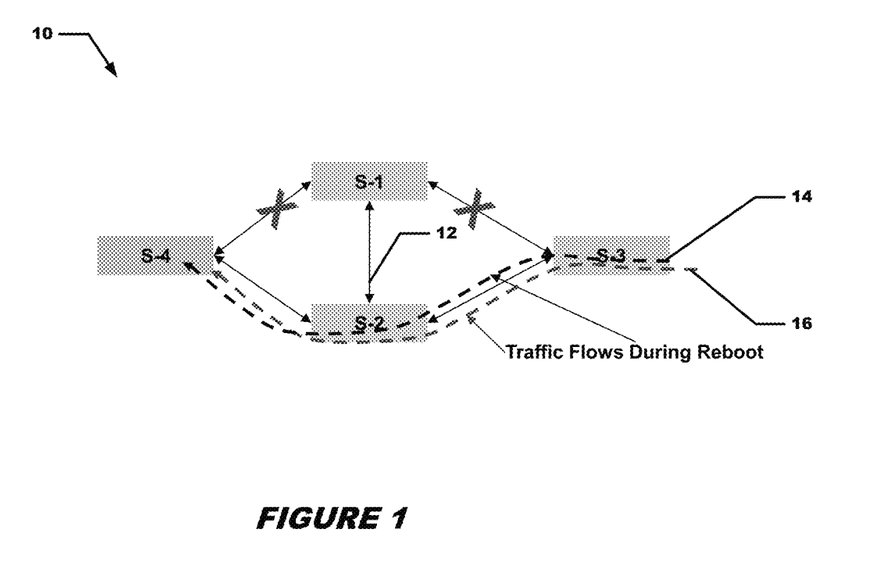
FIG. 1 depicts a prior art IST networking configuration.

Referring now to FIG. 1, a conventional IST configuration 10 is shown. Switches S-1 and S-2 have an IST link 12 between them. As switch S-1 comes up its forwarding table and other control information need to be synchronized with switch S-2. The other control information may include one or more of Multi Chassis Link Aggregation Group (LAG) ports and forwarding tables for Media access control (MAC), Address Resolution Protocol (ARP), Internet Protocol (IP) Multicast. Traffic flow 14, originally intended for switch S-1 is routed to IST peer S-2 until S-1 is fully synchronized. Traffic flow 16 is unaffected.

In conventional virtual IST networking environments, as a first network device comes up to an active state the following steps occur. First, core network links come up and routing protocols are started. Next the first network device discovers path(s) to other switches in its cluster and starts the IST synchronization process. At the same time other switches in the network react to the routing protocol advertisements from the first network device and start forwarding traffic to it. This is potentially the start of the traffic loss window as the first network device does not yet have all the forwarding state that it needs. At some point the IST synchronization process is completed and the first network device has the current forwarding state. Traffic loss stops at this point. Next, access ports are opened up.

The duration of the loss from when other switches in the network react to the routing protocol advertisements from the first network and the IST synchronization process is completed depends on several factors including: the protocol used for cluster synchronization, the number of ports in the system, the size of the forwarding tables, CPU speeds, etc. Given all the factors involved, the duration of the traffic loss can go on for quite a few seconds.

Figure 2:
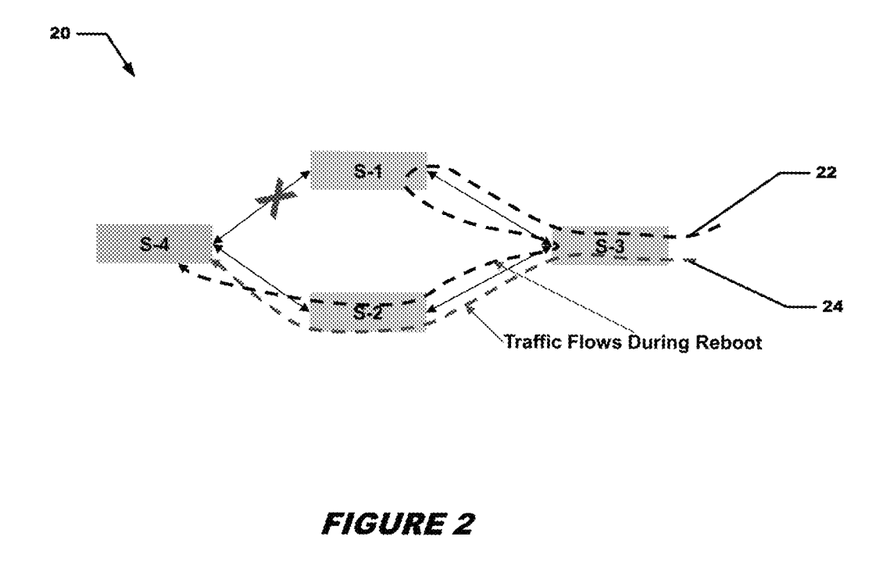
FIG. 2 depicts a virtual IST networking configuration in accordance with a particular embodiment of the present invention.

Referring now to FIG. 2, a virtual IST configuration 20 in accordance with the presently described method for reducing traffic loss when bringing up a switch within a multi chassis switch cluster without using dedicated intra cluster links is shown. In this configuration S-1 and S-2 are peers by way of a virtual IST. As switch S-1 comes up to an active state the following steps occur. First, core network links come up and routing protocols are started. Next the first network device discovers path(s) to other switches in its cluster and starts an IST synchronization process. S-1 installs redirection rules in the datapath which redirect traffic that meet all of the following criteria to its cluster peer S-2. First, the traffic is terminating on S-1 and second, the traffic did not come from one of the cluster peers for S-1. Traffic flow 22 which meets the above criteria is then redirected to cluster peer S-2 (not sent back to the source of the traffic). Following the completion of the IST synchronization process the redirection rules are removed from the Data Path. Traffic 24 is unaffected.

Figure 3:
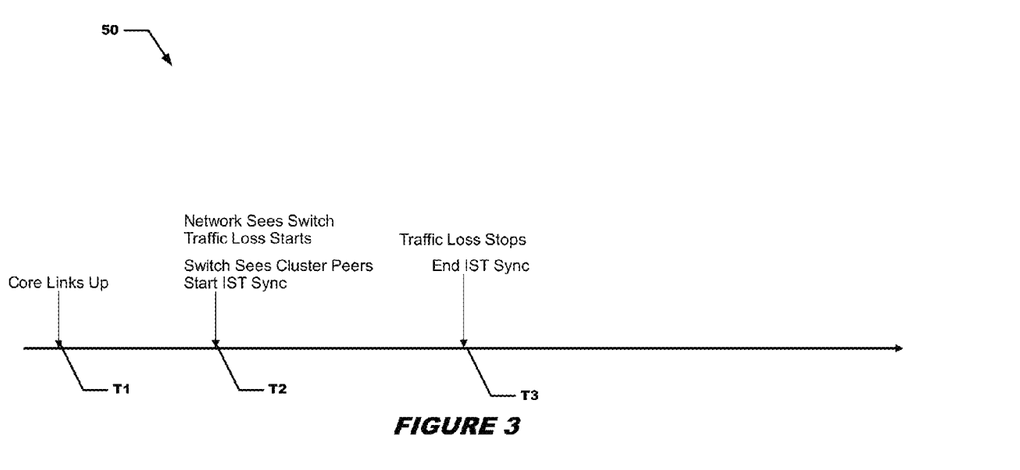
FIG. 3 depicts a timeline showing packet loss in a conventional virtual IST network configuration.

Referring now to FIG. 3, a timeline 50 for conventional IST configurations is shown. At time T1 core links are up. At time T2, the network sees the switch and the switch sees it's cluster peers. IST synchronization starts and concomitantly traffic loss starts. At time T3 IST synchronization ends and traffic loss stops.

Figure 4:
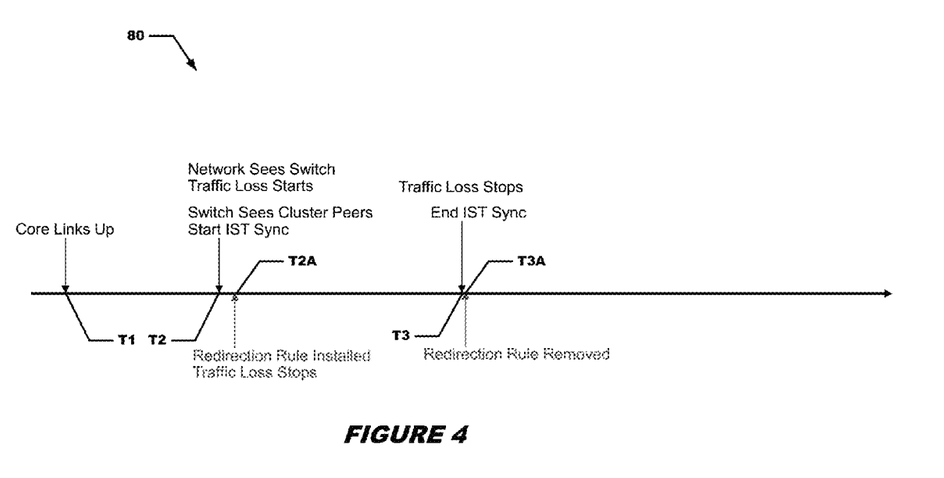
FIG. 4 depicts a timeline showing packet loss in a virtual IST network configuration in accordance with a particular embodiment of the present invention.

Referring now to FIG. 4, a timeline 80 for virtual IST configurations in accordance with the presently described method for reducing traffic loss when bringing up a switch within a multi chassis switch cluster without using dedicated intra cluster links is shown. At time T1 core links are up. At time T2, the network sees the switch and the switch sees its cluster peers. IST synchronization starts and concomitantly traffic loss starts. At time T2A, redirection rules are installed, and traffic loss stops since traffic is now redirected to the IST peer. At time T3 IST synchronization ends and at time T3A, the redirection rules are removed.

The above described process minimizes the traffic loss due to several factors. These factors include the following: the process requires a relatively small number of rules to start redirecting the traffic; the number of redirection rules is independent of the size of the forwarding tables exchanged during IST synchronization; for the redirection of any traffic flow, it does not require the normal flow specific forwarding table entry for that flow (normally redirection is achieved using a flow specific forwarding record like a MAC and/or an ARP record); and the redirection rules can installed in a relatively short amount of time allowing the network device to take as long as it is necessary to complete the IST synchronization.

Figure 5:
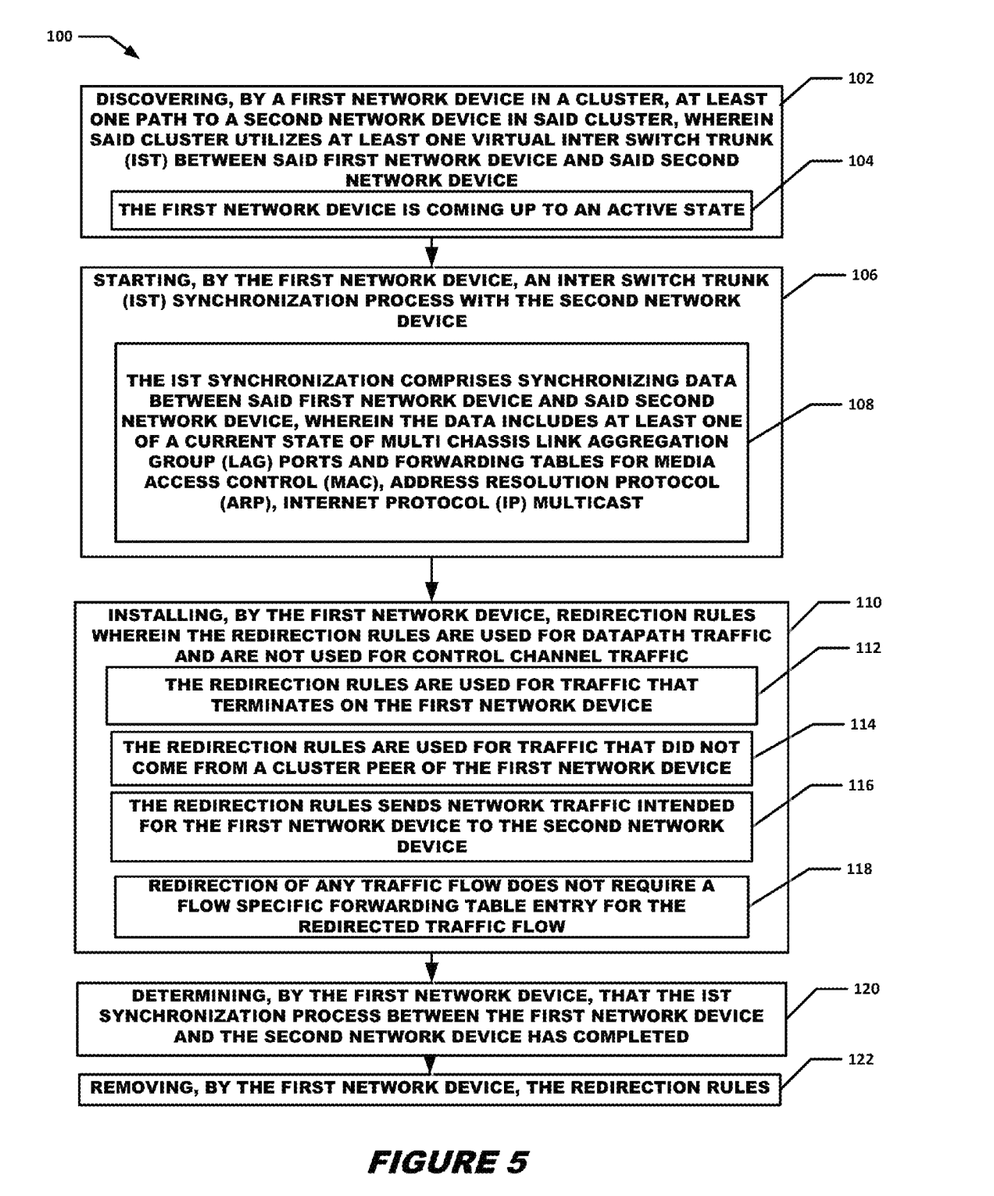
FIG. 5 depicts a flow diagram of a particular embodiment of a method for reducing traffic loss when bringing up a switch within a multi chassis switch cluster without using dedicated intra cluster links in accordance with a particular embodiment of the present invention.

A flow chart of the presently disclosed method is depicted in FIG. 5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

A particular embodiment of a method 100 for reducing traffic loss when bringing up a switch within a multi chassis switch cluster without using dedicated intra cluster links begins with processing block 102 which discloses discovering, by a first network device in a cluster, at least one path to a second network device in the cluster, wherein the cluster utilizes at least one virtual IST between the first network device and the second network device. Processing block 104 states wherein the first network device is coming up to an active state. This may be as a result of a failure and recovery or due to a maintenance operation.

Processing block 106 recites starting, by the first network device, an Inter Switch Trunk (IST) synchronization process with the second network device. As shown in processing block 108 the IST synchronization comprises synchronizing data between the first network device and the second network device, wherein the data includes at least one of a current state of Multi Chassis Link Aggregation Group (LAG) ports and forwarding tables for Media access control (MAC), Address Resolution Protocol (ARP), Internet Protocol (IP) Multicast.

Processing continues with processing block 110 which discloses installing, by the first network device, redirection rules wherein the redirection rules are used for datapath traffic and are not used for control channel traffic. As shown in processing blocks 112 and 114 the redirection rules are used for traffic that terminates on the first network device and are used for traffic that did not come from a cluster peer of the first network device. Processing block 116 states wherein the redirection rules sends network traffic intended for the first network device to the second network device. Processing block 118 recites the redirection of any traffic flow does not require a flow specific forwarding table entry for the redirected traffic flow.

Processing block 120 discloses determining, by the first network device, that the IST synchronization process between the first network device and the second network device has completed. Processing block 122 states removing, by the first network device, the redirection rules.

Figure 6:
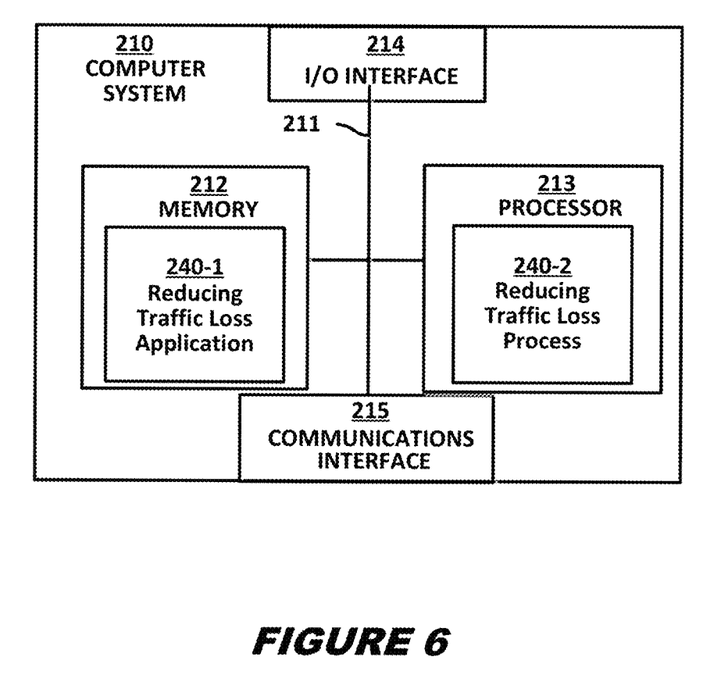
FIG. 6 depicts a block diagram of a network switch for reducing traffic loss when bringing up the switch within a multi chassis switch cluster without using dedicated intra cluster links in accordance with a particular embodiment of the present invention.

FIG. 6 is a block diagram illustrating example architecture of a computer system 210 (such as a network switch which forms part of a virtual IST network configuration) that executes, runs, interprets, operates or otherwise performs a traffic loss reduction operating application 240-1 and traffic loss reduction operating process 240-2 suitable for use in explaining example configurations disclosed herein. An input device 216 (e.g., one or more customer/developer controlled devices such as a keyboard, mouse, etc.) couples to processor 213 through I/O interface 214, and enables a customer 208 to provide input commands, and generally control the graphical customer interface 260 that the traffic loss reduction operating application 240-1 and process 240-2 provides on the display 230. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a traffic loss reduction operating application 240-1 as explained herein. The traffic loss reduction operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a traffic loss reduction operating application 240-1. Execution of a traffic loss reduction operating application 240-1 in this manner produces processing functionality in the traffic loss reduction operating process 240-2. In other words, the traffic loss reduction operating process 240-2 represents one or more portions or runtime instances of a traffic loss reduction operating application 240-1 (or the entire a traffic loss reduction operating application 240-1) performing or executing within or upon the processor 213 in the computerized device 210 at runtime.

It is noted that example configurations disclosed herein include the traffic loss reduction operating application 240-1 itself (i.e., in the form of un-executed or non-performing logic instructions and/or data). The traffic loss reduction operating application 240-1 may be stored on a computer readable medium (such as a floppy disk), hard disk, electronic, magnetic, optical, or other computer readable medium. A traffic loss reduction operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a traffic loss reduction operating application 240-1 in the processor 213 as the traffic loss reduction operating process 240-2. Those skilled in the art will understand that the computer system 210 may include other processes and/or software and hardware components, such as an operating system not shown in this example.

A display 230 need not be coupled directly to computer system 210. For example, the traffic loss reduction operating application 240-1 can be executed on a remotely accessible computerized device via the network interface 215. In this instance, the graphical customer interface 260 may be displayed locally to a customer 208 of the remote computer, and execution of the processing herein may be client-server based.

During operation, processor 213 of computer system 200 accesses memory system 212 via the interconnect 211 in order to launch, run, execute, interpret or otherwise perform the logic instructions of the traffic loss reduction application 240-1. Execution of traffic loss reduction application 240-1 produces processing functionality in traffic loss reduction process 240-2. In other words, the traffic loss reduction process 240-2 represents one or more portions of the traffic loss reduction application 240-1 (or the entire application) performing within or upon the processor 213 in the computer system 200.

It should be noted that, in addition to the traffic loss reduction process 240-2, embodiments herein include the traffic loss reduction application 240-1 itself (i.e., the un-executed or non-performing logic instructions and/or data). The traffic loss reduction application 240-1 can be stored on a computer readable medium such as a floppy disk, hard disk, or optical medium. The traffic loss reduction application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of traffic loss reduction application 240-1 in processor 213 as the traffic loss reduction process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
   discovering, by a first network device in a cluster, a path to a second network device in the cluster, wherein the cluster utilizes a virtual Inter Switch Trunk (IST) between the first network device and the second network device and does not include a conventional IST between the first network device and the second network device;
   starting, by the first network device, an IST synchronization process with the second network device;
   installing, by the first network device, a number of redirection rules prior to completion of the IST synchronization process, wherein:
      the redirection rules are used for datapath traffic and are not used for control channel traffic;
      the number of the redirection rules is independent of a size of forwarding tables exchanged during IST synchronization; and
      the redirection rules indicate that data received by the first network device from a device which is not a cluster peer should be routed to the second network device;
   receiving data via a third device that is not a cluster peer and through which the virtual IST passes;
   forwarding the data back to the third network device via the virtual IST to be routed to the second network device per the redirection rules;
   determining, by the first network device, that the IST synchronization process between the first network device and the second network device has completed; and
   removing, by the first network device, the installed redirection rules upon determining that the IST synchronization process between the first network device and the second network device has completed.

2. The method of claim 1 wherein the redirection rules are used for traffic that terminates on the first network device.

3. The method of claim 1 wherein the redirection rules send network traffic intended for the first network device to the second network device.

4. The method of claim 1 wherein the IST synchronization comprises synchronizing data between the first network device and the second network device, wherein the data includes at least one of a current state of Multi Chassis Link Aggregation Group (LAG) ports and forwarding tables for Media access control (MAC), Address Resolution Protocol (ARP), Internet Protocol (IP) Multicast.

5. The method of claim 1 wherein the first network device is coming up to an active state.

6. The method of claim 1 wherein redirection of any traffic flow does not require a flow specific forwarding table entry for the redirected any traffic flow.

7. A non-transitory computer readable storage medium having computer readable code thereon for reducing traffic loss when bringing up a switch within a multi chassis switch cluster without using dedicated intra cluster links, wherein the code instructs a first network device to perform:
   discovering, by a first network device in a cluster, a path to a second network device in the cluster, wherein the cluster utilizes a virtual Inter Switch Trunk (IST) between the first network device and the second network device and does not include a conventional IST between the first network device and the second network device;
   starting, by the first network device, an IST synchronization process with the second network device;
   installing, by the first network device, a number of redirection rules prior to completion of the IST synchronization process, wherein:
      the redirection rules are used for datapath traffic and are not used for control channel traffic;
      the number of the redirection rules is independent of a size of forwarding tables exchanged during IST synchronization; and
      the redirection rules indicate that data received by the first network device from a device which is not a cluster peer should be routed to the second network device;
   receiving data via a third device that is not a cluster peer and through which the virtual IST passes;
   forwarding the data back to the third network device via the virtual IST to be routed to the second network device per the redirection rules;
   determining, by the first network device, that the IST synchronization process between the first network device and the second network device has completed; and
   removing, by the first network device, the installed redirection rules upon determining that the IST synchronization process between the first network device and the second network device has completed.

8. The computer readable storage medium of claim 7 wherein the redirection rules are used for traffic that terminates on the first network device.

9. The computer readable storage medium of claim 7 wherein the redirection rules send network traffic intended for the first network device to the second network device.

10. The computer readable storage medium of claim 7 wherein the IST synchronization comprises synchronizing data between the first network device and the second network device, wherein the data includes at least one of a current state of Multi Chassis Link Aggregation Group (LAG) ports and forwarding tables for Media access control (MAC), Address Resolution Protocol (ARP), Internet Protocol (IP) Multicast.

11. The computer readable storage medium of claim 7 wherein the first network device is coming up to an active state.

12. The computer readable storage medium of claim 7 wherein redirection of any traffic flow does not require a flow specific forwarding table entry for the redirected any traffic flow.

13. A first network device comprising:
a memory;
a processor;
a communications interface;
an interconnection mechanism coupling the memory, the processor and the communications interface; and
wherein the memory is encoded with an application for reducing traffic loss when bringing up a switch within a multi chassis switch cluster without using dedicated intra cluster links, that causes the processor to perform:
discovering, by a first network device in a cluster, a path to a second network device in the cluster, wherein the cluster utilizes a virtual Inter Switch Trunk (IST) between the first network device and the second network device and does not include a conventional IST between the first network device and the second network device;
starting, by the first network device, an IST synchronization process with the second network device;
installing, by the first network device, a number of redirection rules prior to completion of the IST synchronization process, wherein:
  the redirection rules are used for datapath traffic and are not used for control channel traffic;
  the number of the redirection rules is independent of a size of forwarding tables exchanged during IST synchronization; and
  the redirection rules indicate that data received by the first network device from a device which is not a cluster peer should be routed to the second network device;
receiving data via a third device that is not a cluster peer and through which the virtual IST passes;
forwarding the data back to the third network device via the virtual IST to be routed to the second network device per the redirection rules;
determining, by the first network device, that the IST synchronization process between the first network device and the second network device has completed; and
removing, by the first network device, the installed redirection rules upon determining that the IST synchronization process between the first network device and the second network device has completed.

14. The first network device of claim 13 wherein the redirection rules are used for traffic that terminates on the first network device.

15. The first network device of claim 13 wherein said redirection rules send network traffic intended for the first network device to the second network device.

16. The first network device of claim 13 wherein said IST synchronization comprises synchronizing data between the first network device and the second network device, wherein the data includes at least one of a current state of Multi Chassis Link Aggregation Group (LAG) ports and forwarding tables for Media access control (MAC), Address Resolution Protocol (ARP), Internet Protocol (IP) Multicast.

17. The first network device of claim 13 wherein redirection of any traffic flow does not require a flow specific forwarding table entry for the redirected any traffic flow.

* * * * *